United States Patent [19]
Howard et al.

[11] Patent Number: 5,666,828
[45] Date of Patent: Sep. 16, 1997

[54] CRYOGENIC HYBRID SYSTEM FOR PRODUCING LOW PURITY OXYGEN AND HIGH PURITY OXYGEN

[75] Inventors: Henry Edward Howard; Dante Patrick Bonaquist, both of Grand Island; Paul Louis Just, Tonawanda, all of N.Y.

[73] Assignee: Praxair Technology, Inc., Danbury, Conn.

[21] Appl. No.: 672,463

[22] Filed: Jun. 26, 1996

[51] Int. Cl.6 .................................................. F25J 3/04
[52] U.S. Cl. ........................... 62/644; 62/901; 62/908
[58] Field of Search ........................... 62/642, 644, 655, 62/901, 908

[56] References Cited

U.S. PATENT DOCUMENTS

| | | |
|---|---|---|
| 3,447,331 | 6/1969 | Smith . |
| 3,838,553 | 10/1974 | Doherty . |
| 4,224,045 | 9/1980 | Olszewski et al. . |
| 4,732,580 | 3/1988 | Jain et al. . |
| 4,861,361 | 8/1989 | Jain et al. . |
| 5,090,973 | 2/1992 | Jain . |
| 5,315,833 | 5/1994 | Ha et al. . |
| 5,349,824 | 9/1994 | Ha et al. . |

FOREIGN PATENT DOCUMENTS

| | | | |
|---|---|---|---|
| 1416163 | 12/1975 | United Kingdom | 62/642 |
| 1586961 | 3/1981 | United Kingdom . | |

*Primary Examiner*—Christopher Kilner
*Attorney, Agent, or Firm*—Stanley Ktorides

[57] ABSTRACT

A method for producing low purity oxygen and high purity oxygen using a cryogenic rectification column wherein feed air is enriched in oxygen in an upstream adsorbent bed system prior to passage into the column and refrigeration is generated by turboexpansion of adsorbent bed effluent or column top vapor.

7 Claims, 3 Drawing Sheets

CRYOGENIC HYBRID SYSTEM FOR PRODUCING LOW PURITY OXYGEN AND HIGH PURITY OXYGEN

TECHNICAL FIELD

This invention relates generally to cryogenic rectification and more particularly to systems for producing oxygen at two different purities.

BACKGROUND ART

Generally a user of oxygen requires the oxygen at a certain purity and a typical air separation facility is designed to produce oxygen at one purity level. Occasionally there arises a need for the supply of oxygen at two separate purity levels. While conventional air separation facilities may be used to provide oxygen product at two different purity levels, such facilities are costly to operate.

Accordingly, it is an object of this invention to provide a system which can efficiently produce both low purity oxygen and high purity oxygen.

SUMMARY OF THE INVENTION

The above and other objects, which will become apparent to one skilled in the art upon a reading of this disclosure, are attained by the present invention which is:

A method for producing low purity oxygen and high purity oxygen comprising:

(A) passing feed air through an adsorbent system comprising at least one adsorbent bed and adsorbing nitrogen from the feed air onto the adsorbent to produce first low purity oxygen;

(B) passing at least some of the first low purity oxygen into a column and separating the first low purity oxygen within the column by cryogenic rectification into second low purity oxygen and into high purity oxygen;

(C) recovering high purity oxygen from the lower portion of the column as product high purity oxygen; and (D) recovering at least some of at least one of the first low purity oxygen and the second low purity oxygen as product low purity oxygen.

As used herein the term "feed air" means a mixture comprising primarily oxygen and nitrogen, such as ambient air.

As used herein the term "low purity oxygen" means a fluid having an oxygen concentration with the range of from 50 to 98.5 mole percent.

As used herein, the term "high purity oxygen" means a fluid having an oxygen concentration greater than 98.5 mole percent.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*.

Vapor and liquid contacting separation processes depend on the difference in vapor pressures for the components. The high vapor pressure (or more volatile or low boiling) component will tend to concentrate in the vapor phase whereas the low vapor pressure (or less volatile or low boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangement that utilize the principles of rectification to separate mixtures are often interchangeably termed rectification columns, distillation or columns, or fractionation column. Cryogenic rectification is a rectification process carried out at least in part at temperatures at or below 150 degrees Kelvin (K).

As used herein, the term "indirect heat exchange" means the bringing of two fluid streams into heat exchange relation without any physical contact or intermixing of the fluids with each other.

As used herein the term "reboiler" means a heat exchange device which generates column upflow vapor from column liquid.

As used herein, the terms "turboexpansion" and "turboexpander" mean respectively method and apparatus for the flow of high pressure gas through a turbine to reduce the pressure and the temperature of the gas thereby generating refrigeration.

As used herein, the terms "upper portion" and "lower portion" mean those sections of a column respectively above and below the mid point of the column.

As used herein, the term "adsorbent" means a material (typically a solid) that can accept or capture a gas or liquid species within its interstices or pores. Examples of adsorbents include alumina, silica, carbon and molecular sieves. A particularly preferred adsorbent is nitrogen selective molecular sieve.

As used herein, the term "adsorbent bed" means a collection of adsorbent particles in proximity to each other and configured such that it is able to be contacted by a fluid.

The numerals in the Figures are the same for the common elements.

DETAILED DESCRIPTION

The invention will be described in detail with reference to the Drawings.

Figure 1:
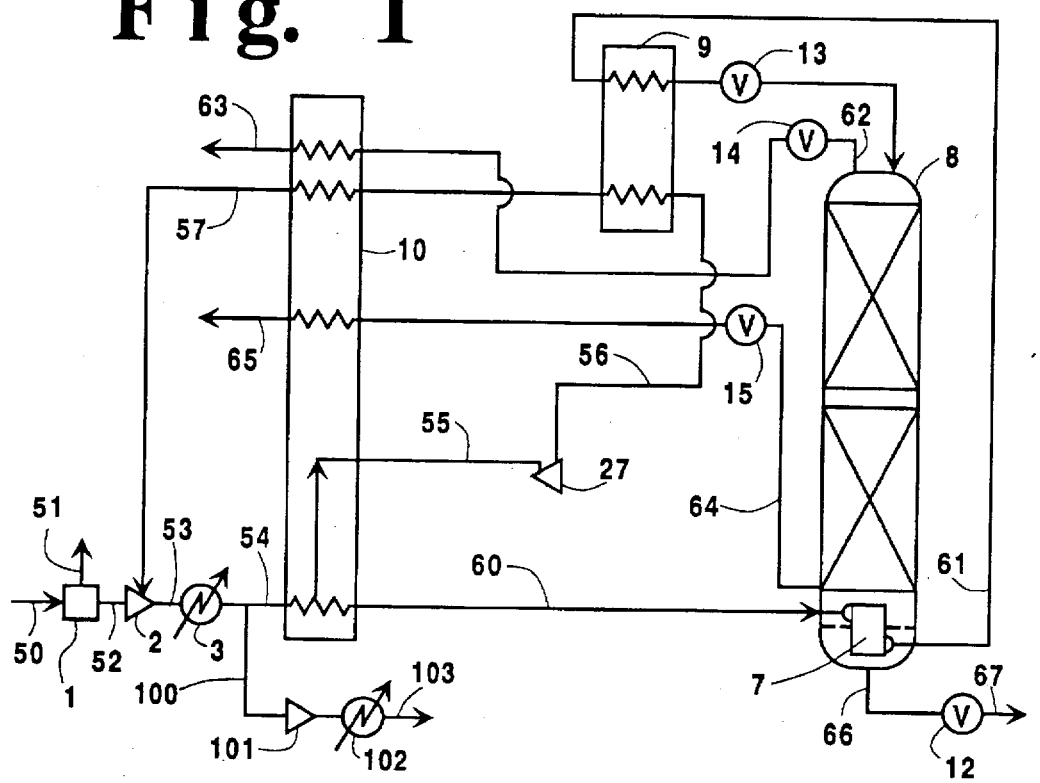
FIG. 1 is a schematic representation of one embodiment of the dual purity oxygen production system of the invention.

Referring now to FIG. 1, feed air 50 is passed into adsorbent system 1 which comprises an adsorbent bed wherein nitrogen of the feed air is preferably adsorbed onto the adsorbent particles which comprise the adsorbent bed, resulting in the production of first low purity oxygen having an oxygen concentration preferably within the range of from 80 to 95 mole percent. Feed air 50 may be processed in one or more adsorbent beds, i.e. adsorbent system 1 may comprise two or more separate adsorbent beds along with the piping and valving typically associated with a multiple bed adsorbent system. The enriched nitrogen waste stream from adsorbent bed system 1 is vented to the atmosphere via stream 51.

At least some of the first low purity oxygen is passed in stream 52 to compressor 2 wherein it is compressed to a pressure generally within the range of from 30 to 200 pounds per square inch absolute (psia). Pressurized first low purity oxygen stream 53 is passed through cooler 3 to remove the heat of compression and resulting stream 54 is cooled by passage through main heat exchanger 10 by indirect heat exchange with return and turboexpanded streams. A portion 100 of stream 54 may be taken upstream of main heat exchanger 10, further compressed to a pressure up to about 450 psia by passage through compressor 101, cooled of heat of compression through cooler 102 and recovered as low purity oxygen product in stream 103.

A portion of the first low purity oxygen may be turboexpanded to generate refrigeration. In the embodiment illustrated in FIG. 1, portion 55 is taken from stream 54 after partial traverse of main heat exchanger 10 and turboexpanded by passage through turboexpander 27 to generate refrigeration. Turboexpanded stream 56 is then warmed by passage through heat exchanger 9 and main heat exchanger 10. Resulting stream 57 is returned to compressor 2 and combined with stream 52. Alternatively, the process refrigeration could be provided by liquid addition, such as to the sump (reboiler 7) of column 8.

First low purity oxygen is passed in stream 60 into bottom reboiler 7 wherein it is at least partially condensed by indirect heat exchange with high purity oxygen. Resulting first low purity oxygen 61 is then further cooled by passage through heat exchanger 9 and then passed through valve 13 into column 8.

Column 8 is operating at a pressure generally within the range of from 30 to 170 psia and preferably within the range of from 100 to 150 psia. Within column 8 the first low purity oxygen is separated by cryogenic rectification into second low purity oxygen and into high purity oxygen.

Second low purity oxygen, having an oxygen concentration less than that of first low purity oxygen and generally less than 90 mole percent, is withdrawn from the upper portion of column 8 as stream 62, passed through valve 14 and then warmed by passage through main heat exchanger 10. Resulting second low purity stream 63 may then, if desired, be recovered in whole or in part as product low purity oxygen or reintroduced into compressor 2.

High purity oxygen is recovered from the lower portion of column 8 as liquid and/or gas, and both options are illustrated in FIG. 1. Gaseous high purity oxygen stream 64 is withdrawn from column 8 above reboiler 7, passed through valve 15 and warmed by passage through main heat exchanger 10. Resulting stream 65 is recovered as gaseous high purity oxygen product. Liquid high purity oxygen stream 66 is withdrawn from column 8, passed through valve 12 and recovered in stream 67 as liquid high purity oxygen product.

Figure 2:
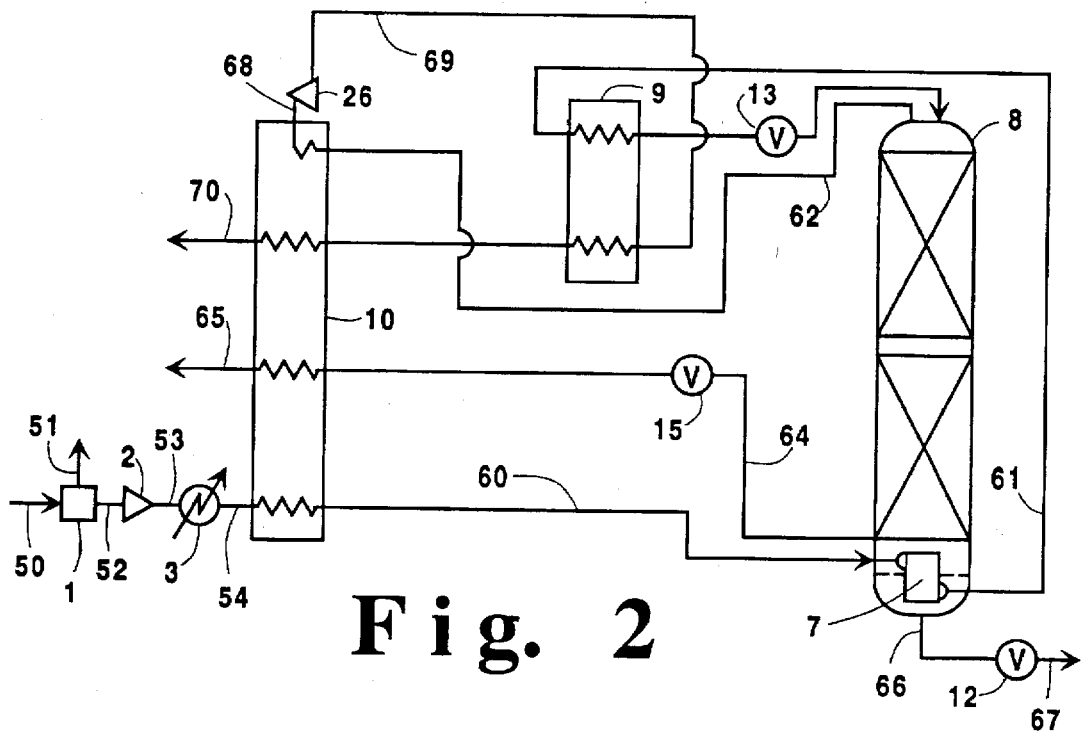
FIG. 2 is a schematic representation of another embodiment of the invention wherein column top vapor is used to generate refrigeration.

FIG. 2 illustrates another embodiment of the invention wherein refrigeration is generated by turboexpansion of second low purity oxygen. The elements of the embodiment illustrated in FIG. 2 which were described with reference to FIG. 1 will not be described again in detail. Referring now to FIG. 2, first low purity oxygen is passed as stream 60 to bottom reboiler 7. Second low purity oxygen stream 62 is withdrawn from the upper portion of column 8 and warmed by partial traverse of main heat exchanger 10. Resulting stream 68 is turboexpanded through turboexpander 26 to generate refrigeration. Resulting turboexpanded stream 69 is warmed by passage through heat exchanger 9 and main heat exchanger 10 and resulting second low purity oxygen stream 70 may, if desired, be recovered in whole or in part as product low purity oxygen.

Figure 3:
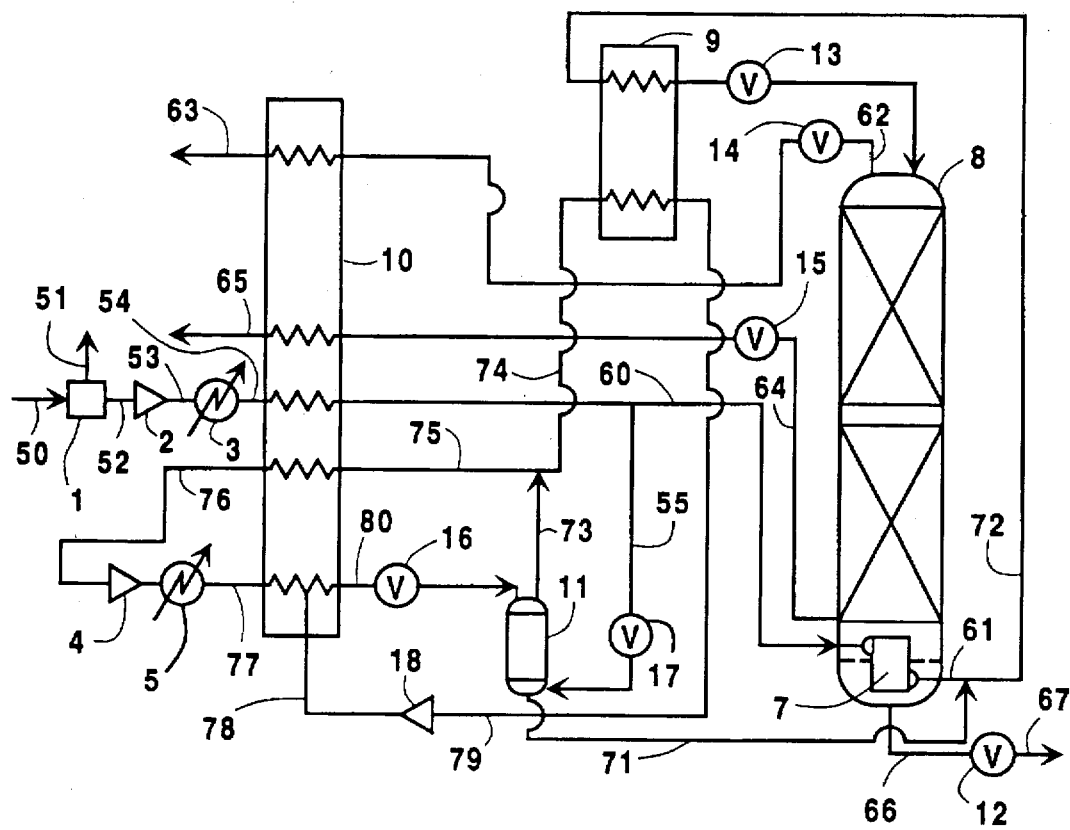
FIG. 3 is a schematic representation of yet another embodiment of the invention wherein an ancillary column is employed in a refrigeration generation loop.

FIG. 3 illustrates another embodiment of the invention wherein an ancillary column is employed in the first low purity oxygen refrigeration loop. The elements of the embodiment illustrated in FIG. 3 which were described with reference to the previously described embodiments will not be described again in detail.

Referring now to FIG. 3, first low purity oxygen portion 55 is passed through valve 17 and into ancillary column 11. As this vapor passes up ancillary column 11 against downflowing liquid, it becomes progressively richer in the light components, e.g. nitrogen and argon, while the downflowing liquid becomes progressively richer in oxygen. The resulting oxygen-enriched downflowing liquid is withdrawn from the lower portion of ancillary column 11 as stream 71 and combined with stream 61 from bottom reboiler 7 to form stream 72 which is then passed through heat exchanger 9 and valve 13 into column 8. Resulting oxygen-leaner upflowing vapor is withdrawn from the upper portion of ancillary column 11 as stream 73. This stream is combined with refrigeration loop stream 74 to form stream 75 which is warmed by passage through main heat exchanger 10. Resulting stream 76 is compressed by passage through compressor 4 and cooled of the heat of compression through cooler 5.

Resulting stream 77 is passed into main heat exchanger 10. A portion 78 of stream 77 is withdrawn after partial traverse of main heat exchanger 10 and turboexpanded through turboexpander 18 to generate refrigeration. Resulting turboexpanded stream 79 is then warmed by passage through heat exchanger 9 to form stream 74 which is processed as described above. Remaining portion 80 of stream 77 is condensed by the complete traverse of main heat exchanger 10 and then passed through valve 16 and into the upper portion of ancillary column 11 as the aforesaid downflowing liquid.

Figure 4:
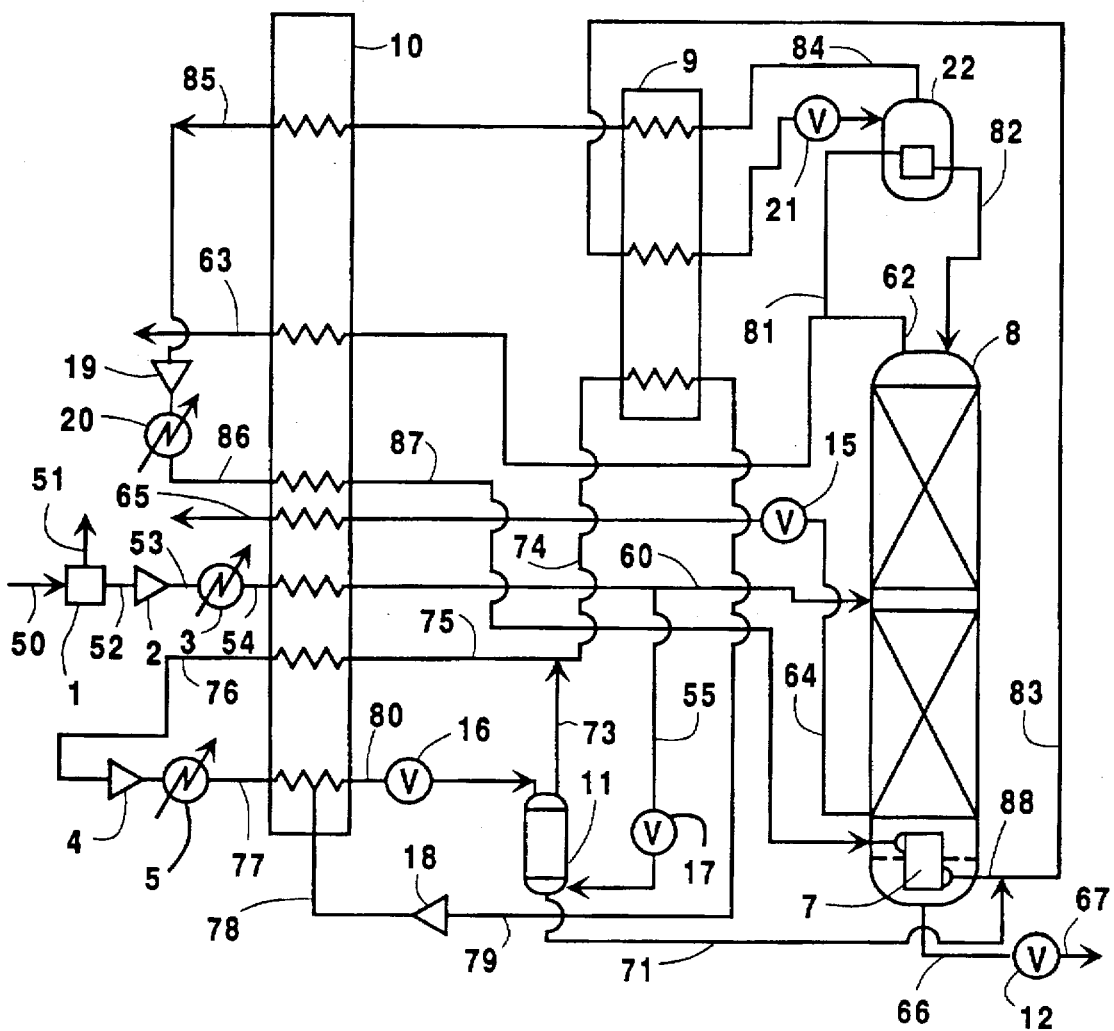
FIG. 4 is a schematic representation of a further embodiment of the invention wherein the column is reboiled by recirculating fluid.

FIG. 4 illustrates another embodiment of the invention wherein the column is reboiled using a recirculating heat pump circuit. The elements of the embodiment illustrated in FIG. 4 which were described with reference to the previously described embodiments will not be described again in detail.

Referring now to FIG. 4, first low purity oxygen stream 60 is passed directly into column 8 without first passing through reboiler 7. Heat pump stream 83 is subcooled by passage through heat exchanger 9 and then passed through valve 21 and into condenser 22. A portion 81 of second low purity oxygen stream 62 is passed into condenser 22 wherein it is condensed by indirect heat exchange with the vaporizing liquid passed into condenser 22 in stream 83. Resulting condensed second low purity oxygen stream 82 is then passed into the upper portion of column 8 as reflux. Vaporized fluid is withdrawn from condenser 22 as stream 84 and warmed by passage through heat exchangers 9 and 10. Resulting stream 85 is compressed through compressor 19 and cooled of the heat of compression through cooler 20. Resulting heat pump stream 86 is then cooled by passage though main heat exchanger 10 to form stream 87 and then passed into bottom reboiler 7 wherein it is at least partially condensed against boiling high purity oxygen. Resulting stream 88 is then combined with stream 71 to form heat pump stream 83 which is processed as described above. If desired, column 8 may be operated with two bottom reboilers, one driven by recirculating heat pump fluid, as illustrated in FIG. 4, and the other driven by first low purity oxygen, as illustrated, for example, in FIG. 3.

Now by the use of this invention, one can efficiently produce both low purity and high purity oxygen. Although the invention has been described in detail with reference to certain preferred embodiments, those skilled in the art will recognize that there are other embodiments of the invention within the spirit and the scope of the claims.

We claim:

1. A method for producing low purity oxygen and high purity oxygen comprising:
   (A) passing feed air through an adsorbent system comprising at least one adsorbent bed and adsorbing nitrogen from the feed air onto the adsorbent to produce first low purity oxygen;
   (B) passing some of the first low purity oxygen into a column and separating the first low purity oxygen within the column by cryogenic rectification into second low purity oxygen and into high purity oxygen;
   (C) recovering high purity oxygen from the lower portion of the column as product high purity oxygen;
   (D) recovering at least some of the first low purity oxygen and the second low purity oxygen as product low purity oxygen; and
   (E) returning some of the second low purity oxygen to the column.

2. The method of claim 1 wherein first low purity oxygen is condensed by indirect heat exchange with high purity oxygen prior to being passed into the column.

3. The method of claim 1 wherein a portion of the first low purity oxygen is turboexpanded and then passed in indirect heat exchange with the first low purity oxygen to cool the first low purity oxygen prior to the passage of the first low purity oxygen into the column.

4. The method of claim 3 wherein prior to the said turboexpansion of the said first low purity oxygen portion, the first low purity oxygen portion is processed in an ancillary column.

5. The method of claim 1 wherein a portion of the second low purity oxygen is turboexpanded and then passed in indirect heat exchange with the first low purity oxygen to cool the first low purity oxygen prior to the passage of the first low purity oxygen into the column.

6. The method of claim 1 wherein the first low purity oxygen has an oxygen concentration within the range of from 80 to 95 mole percent.

7. The method of claim 1 further comprising compressing a portion of the first low purity oxygen and recovering the resulting compressed portion as elevated pressure low purity oxygen product.

* * * * *